Figure 1:
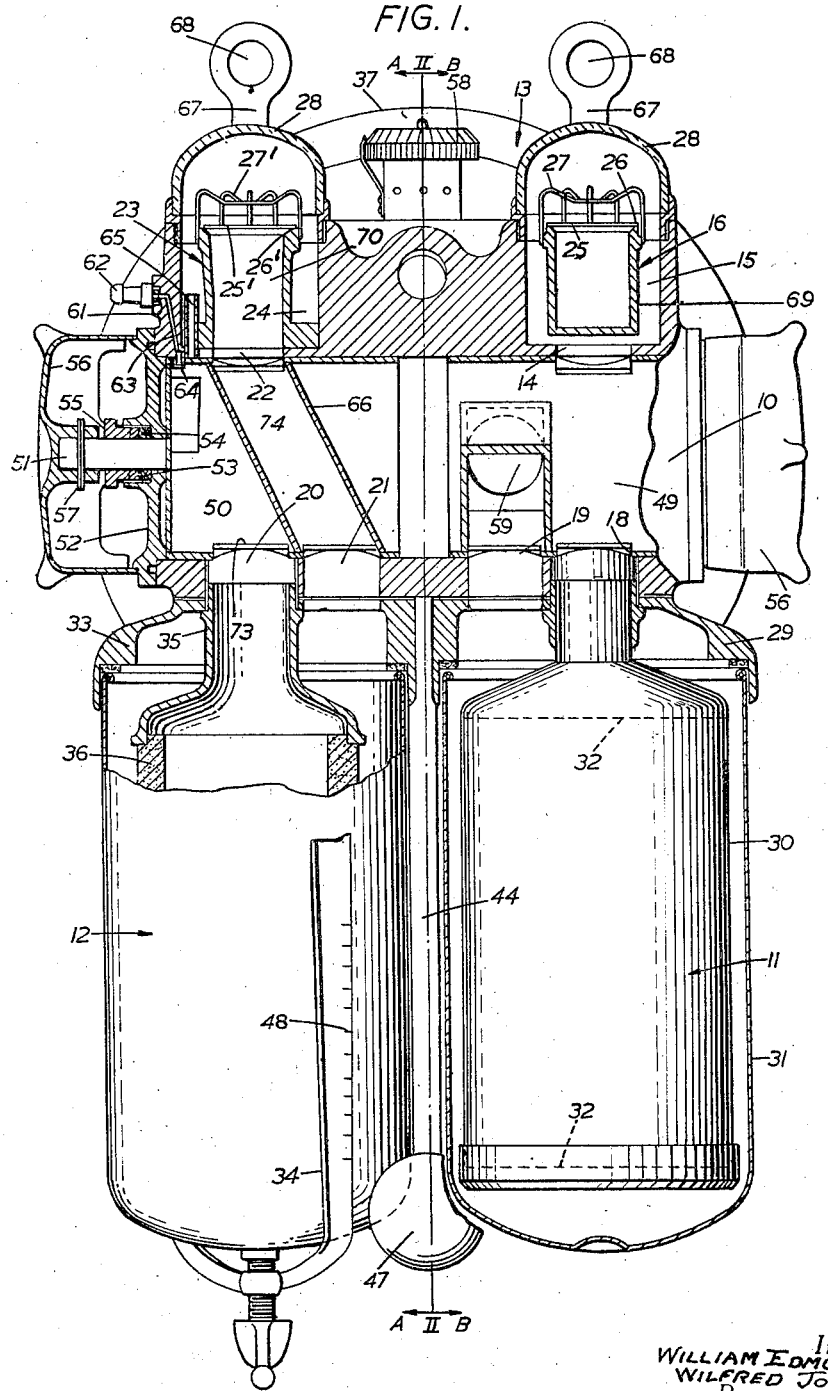

Nov. 6, 1945.   W. EDMONDSON ET AL   2,388,533
ADMINISTRATION OF INHALANT GASES
Filed Nov. 14, 1942   4 Sheets-Sheet 4

Inventors
WILLIAM EDMONDSON
WILFRED JONES
Attorney

Patented Nov. 6, 1945

2,388,533

UNITED STATES PATENT OFFICE 2,388,533

ADMINISTRATION OF INHALANT GASES

William Edmondson and Wilfred Jones, Surrey County, England, assignors to The British Oxygen Company Limited, London, England, a British company Application November 14, 1942, Serial No. 465,536
In Great Britain November 17, 1941

5 Claims. (Cl. 128—202)

The present invention relates to the administration of inhalant gases.

In the administration of inhalant gas mixtures, especially gas mixtures used for producing a state of anaesthesia or analgesia, it is frequently desirable to arrange for the re-inhalation of at least a part of the exhaled gases. For this purpose it is often necessary to remove the carbon dioxide from the exhaled gases before re-inhalation thereof. If a far-reaching removal of carbon dioxide can be achieved it is possible to operate in a closed cycle, the gases being continually inhaled, exhaled and reinhaled with the addition of only small amounts of oxygen to replace that which has been converted to carbon dioxide and to make up any small losses due to leakage.

Whilst theoretically it should be possible to remove substantially all the carbon dioxide by bringing the exhaled gas into contact with a sufficiently large mass of absorbent, such as soda lime, it is essential that there should be minimum opposition to gas flow and the quantity of absorbent which can be used is therefore limited.

Closed cycle operations hitherto practised have comprised the step of passing the exhaled gas unidirectionally through a mass of absorbent, the gas passing into a re-breathing reservoir, such as a rubber bag, from which the patient inspires. Alternatively, the exhaled gas has been passed to and fro through a single passage containing a mass of carbon dioxide absorbent and a terminal breathing reservoir. This has proved more efficient from the point of view of carbon dioxide absorption than the aforementioned unidirectional method in which the exhaled gas traverses the absorbent once only before being re-inhaled, but suffers from the disadvantage that the gas expelled during the latter part of the expiration period and which contains the highest proportion of carbon dioxide will remain in the passage between the mask and the absorbent to be re-inhaled during the succeeding inspiration period. To reduce this space to a minimum it has been the practice to dispose the absorbent close to the face mask. This is, however, disadvantageous owing to the weight and bulk of the absorbent and its container and on account of the heat generated by the absorption of carbon dioxide which raises the temperature of the re-inhaled gas mixture to an uncomfortably high level.

It is an object of this invention to provide a method of and apparatus for the closed cycle administration of inhalant gases in which the efficient absorption of carbon dioxide obtainable hitherto with the to-and-fro method of operation is coupled with the advantage of the unidirectional flow to the extent that the absorbent may be located remote from the patient, thereby avoiding any necessity for mounting bulky and heavy apparatus upon or near to the face of the patient whilst at the same time providing sufficient area to dissipate the heat generated by absorption.

It is another object of this invention to provide in such apparatus means whereby a controlled quantity of anaesthetic vapour or other vaporous constituent may be admixed when desired with the gases to be reinhaled.

A further object of this invention is to provide in such apparatus means whereby fresh gas may be delivered with or without admixture of exhaled gas and whereby fresh gas with or without admixture of exhaled gas may be admixed with a controlled quantity of anaesthetic vapour or other vaporous constituent.

It is yet a further object of this invention to provide in such apparatus means whereby forced breathing may be applied with the minimum of delay should the need arise.

These and other objects are achieved by administering an inhalant gas mixture by the method which comprises directing expired gas containing carbon dioxide through an expiratory channel into and through a mass of absorbent for carbon dioxide into a rebreathing reservoir and supplying gas during the inspiratory period from the rebreathing reservoir, the gas returning through the mass of absorbent and through an inspiratory channel separate from the expiratory channel, the gases being prevented from entering the inspiratory channel during the expiratory period and being prevented from being re-inhaled through the expiratory channel during the inspiratory period.

Apparatus for carrying the aforesaid method into effect may comprise a unidirectional valve having an inlet port adapted to be connected to an expiratory channel and a discharge port adapted to be connected to a container for carbon dioxide absorbent, a rebreathing reservoir for the reception of expired gas after passage through the carbon dioxide absorbent, and a second unidirectional valve having an inlet port adapted to be connected to the rebreathing reservoir through the container for carbon dioxide absorbent and a discharge port adapted to be connected to an inspiratory channel.

During an expiratory period, the expired gas passes through the expiratory channel and the unidirectional valve connected thereto, into and through the carbon dioxide absorbent into the rebreathing reservoir. During an inspiratory period, the gas passes from the rebreathing reservoir, into and through the carbon dioxide absorbent and into the inspiratory channel through the second unidirectional valve. By this means unidirectional flow is ensured coupled with the advantage of highly efficient carbon dioxide removal.

Apparatus for carrying such method into effect may comprise in combination proportioning valve mechanism and a rebreathing reservoir, the valve mechanism having a main inlet port for the reception of exhaled gases, whence the gases are arranged to pass to the rebreathing reservoir, and a main outlet port for the delivery of an inhalant gas from the rebreathing reservoir, the valve mechanism being adapted to be connected to a unit for effecting carbon dioxide absorption, and being operable to control the proportion of gas traversing the absorption unit on passing into and out of the rebreathing reservoir.

The valve mechanism preferably comprises a casing which supports the rebreathing reservoir and constitutes a part of the reservoir wall, the remaining part of the reservoir wall being at least in part expansible. The expansible part of the rebreathing reservoir may be coupled to one end of a lever pivotally mounted intermediate its ends in a bearing supported by said casing, the free end of said lever serving both to indicate by its movement the depth of breathing and as the means for effecting manual compression and expansion of said rebreathing reservoir when it is desired to effect artificial inspiration and exhalation.

To enable air to be administered when effecting artificial inspiration, the casing may be provided with an auxiliary valve-controlled inlet adapted to open automatically and permit air to enter when the reservoir is expanded manually.

For controlling the direction of gas flow through the apparatus the main inlet and outlet ports may be provided with unidirectional valve means, each mounted within a housing which is at least in part transparent to permit of ready observation of the functioning of the valve means.

To permit of the apparatus being used for the administration of a fresh gas without circulation or re-inhalation of exhaled gas, the proportioning valve may be provided with by-pass means whereby fresh gas under pressure may be delivered to the main outlet port without traversing the rebreathing reservoir.

To provide for the inclusion in the gas stream of the vapour of a volatile liquid such as ether or chloroform, the apparatus may comprise means including a proportioning valve whereby the gas may wholly or in part be contacted with the vapour of a volatile liquid.

The proportioning valve for vapour entrainment and the proportioning valve mechanism for controlling the degree of carbon dioxide absorption may be constituted by a pair of rotary sleeve valves comprising independently operable rotary or semi-rotary ported drums mounted within a ported sleeve member constituting the supporting casing.

Figure 2:
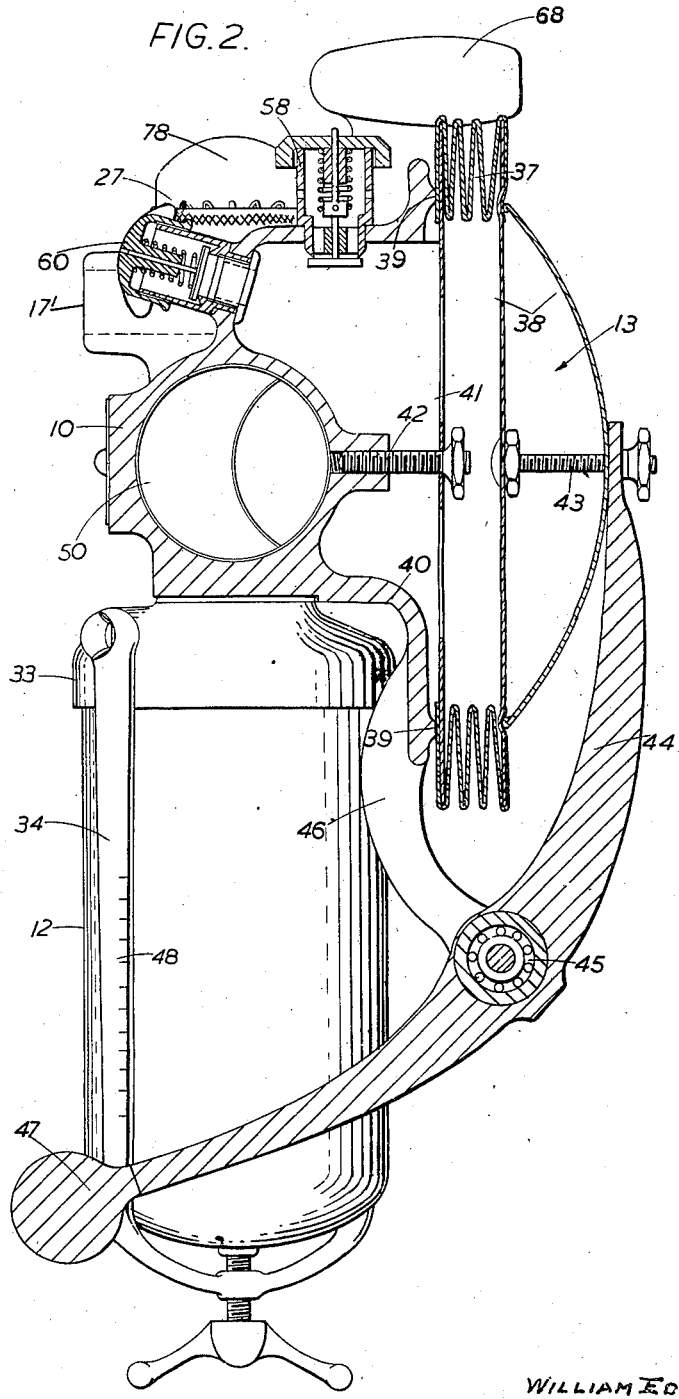
Figure 3:
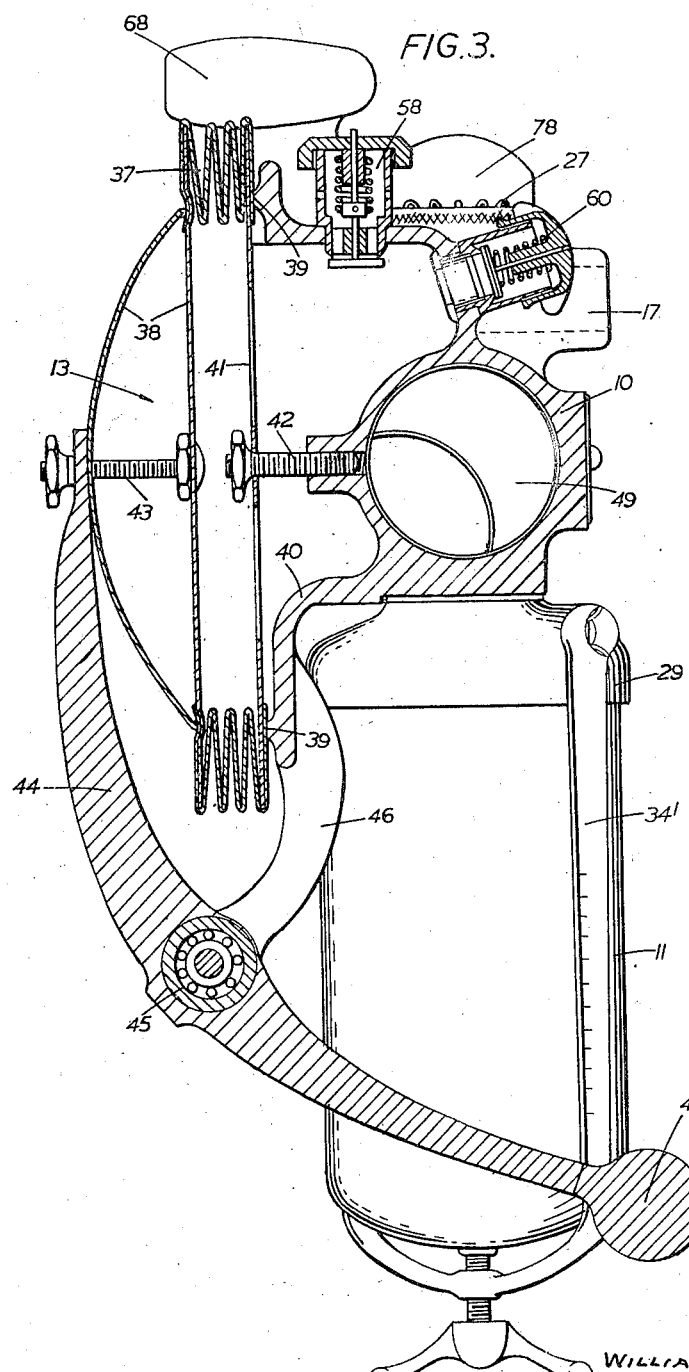
Figure 4:
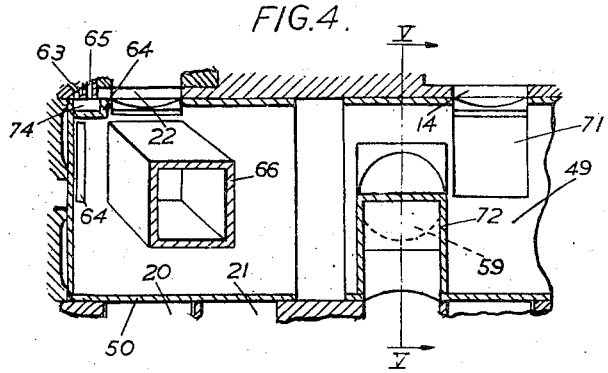
Figure 5:
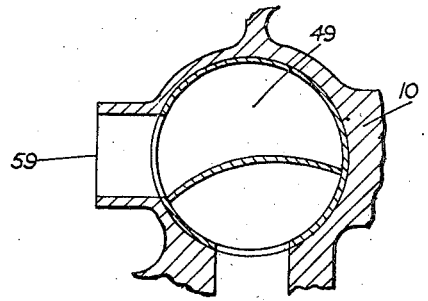

The invention will now be described in further detail with reference to the accompanying drawings which show apparatus for the administration of gases by the method specified but which can also be used for the direct administration of fresh gas and in which:

Fig. 1 is a view in front elevation and partly in section with parts omitted for the sake of clarity, Fig. 2 is a sectional side elevation on the line II—II of Fig. 1 viewed in the direction of the arrows A, Fig. 3 is a sectional side elevation on the line II—II of Fig. 1 viewed in the direction of the arrows B, Fig. 4 is a view in section similar to Fig. 1 but showing only a portion of the apparatus with parts in different operative position, and Fig. 5 is a fragmentary section on line V—V of Fig. 4 viewed in the direction of the arrows.

Referring to the drawings, the apparatus includes proportioning valve mechanism comprising a hollow cylindrical casing 10 adapted to support a carbon dioxide absorbing unit 11, a container 12 for ether or other volatile liquid, and a rebreathing reservoir 13. Casing 10 has a main inlet port 14 communicating through a unidirectional valve 16 with a socket 17 adapted to be coupled to an expiratory tube leading from the face mask (not shown). Valve 16 comprises an outer chamber 15 surrounding port 14 and formed integrally with the casing 10, and an inner chamber or thimble 69 capped by a floating disc 25 which rests upon an annular seating 26 formed around the mouth of the thimble, the disc being protected against lateral displacement by a wire cage 27. The socket 17 extends into the thimble 69 and is joined to it in gas-tight manner. With this arrangement it will be seen that expired air entering socket 17 passes into the thimble 69, raises disc 25 to pass into the outer chamber 15 and then into port 14. Flow of gas in the reverse direction is prevented by the disc 25 and expiration through the expiratory tube is thereby inhibited.

A pair of ports 18, 19 are formed in the casing 10 for leading gas through the absorbing unit 11 and a further pair of ports 20, 21 are provided in the casing for leading gas through the container 12.

The main outlet port 22 is in communication through a second unidirectional valve 23 with a socket 17' similar to inlet socket 17 but adapted to be coupled to an inspiratory tube (not shown) connected to the face mask. Valve 23 comprises an outer chamber 24 into which socket 17' extends, chamber 24, like chamber 15, being formed integrally with the casing 10, and an inner chamber 70 surrounding port 22 and capped by a floating disc 25' resting upon an annular seating 26' on which is mounted a wire cage 27'. Inspired air drawn through socket 17' passes from port 22 into chamber 70, raises the floating disc 25' to enter the outer chamber 24 and then passes out of the apparatus through socket 17'. Flow of gas in the reverse direction is prevented by disc 25' and expired air cannot therefore, enter the apparatus through the inspiratory tube.

Transparent domes 28 of glass or other suitable material may be used to cap valve chambers 15 and 24 to permit of ready observation of the functioning of the valves.

Ports 18, 19, are surrounded by an annular cover 29 to which the carbon dioxide absorption unit 11 is clamped by means of a stirrup 34'. The absorption unit comprises an inner container 30 depending from port 18 and an outer container 31 clamped to the cover 29. Inner container 30 holds a granular absorbent, such as soda lime, being fitted at top and bottom with gauze filters 32 for holding the absorbent in place whilst permitting gas to pass to and fro between ports 18 and 19. The ports 20, 21 are surrounded by an annular cover 33 depending from casing 10 and serving to close the open end of the liquid container 12 which is clamped to the cover 33 by means of a stirrup 34. Port 20 is fitted with an adaptor 35 supporting a wick 36 dipping down into the liquid to facilitate vapour pick-up.

The rebreathing reservoir 13 is mounted on the rear side of casing 10 and communication between the reservoir and the interior of casing 10 is established by means of a port 59. Reservoir 13 comprises accordion pleats 37 held at the outer end between a pair of cover plates 38 and being clamped at the inner end to an annular seating 39 formed at the outer end surface of a projecting web 40 integral with casing 10. A spider 41 secured to the casing 10 by bolt 42 serves to hold the inner end of the accordion pleats 37 firmly in contact with the seating 39. A bolt 43 serves to clamp the cover plates 38 together and is also used to anchor to the cover plates one end of a lever 44 pivotally mounted intermediate its ends in a ball bearing 45 housed in a forked bracket 46 depending from the web 40. At its free end lever 44 carries a handle 47, and a series of graduations 48, which may conveniently be marked on a limb of stirrup 34, may be provided to furnish an indication of the depth of breathing.

Within the hollow cylindrical casing 10 and making a sliding fit therewith are mounted two drums 49 and 50. Each drum 49, 50 has an operating spindle 51 and is held in position within casing 10 by means of a gland housing 52 secured as by screws to the casing 10. Spindle 51, extending through gland packing 53, gland washer 54 and gland nut 55, has mounted upon its outer extremity an operating knob 56 to which it is secured by a taper pin 57. Each drum is closed at its outer end and open at its inner end so that gas is free to pass in the axial direction from one drum to the other.

Drum 49 is provided with a channel 71 in alignment with ports 14 and 18 and extending circumferentially over a sector of the drum; another channel 72 is provided in alignment with ports 19 and 59. The two channels are so arranged that, in one extreme position of the drum (Fig. 1) gas passes wholly from port 14 to port 18 and in the other extreme position (Figs. 4 and 5), port 18 is closed and gas passes direct to port 59. At any intermediate position of the drum, port 18 is partially open, and a portion of the gas passes through port 18 and the remainder direct from port 15 to port 59.

Drum 50 has a port 73 in circumferential alignment with port 20 in casing 10 and a passage 66 arranged to connect port 21 to port 22. When drum 50 is in the extreme position shown in Fig. 1 gas from drum 49 passes wholly through ports 20, 21, and passage 66 to port 22. When in the other extreme position shown in Fig. 4, ports 20 and 21 are closed and gas passes direct to port 22.

A unidirectional inspiratory valve 58, the loading of which is adjustable, is provided to admit air to the rebreathing reservoir, and a passage 59 serves to establish direct communication between the port 19 and the rebreathing reservoir so that gas may pass direct thereinto without traversing the absorbing unit 11. An adjustable spring-loaded expiratory valve 60 is provided as a safety relief valve for the rebreathing reservoir.

For supplying fresh gas such as oxygen or nitrous oxide, to the inspired stream a duct 61 is formed in casing 10 furnished with a nipple 62. A passage 63 leads from duct 61 to the drum 50 which is provided with two circumferentially-extending channels 64, 74, either of which can be brought into register with passage 63 according to the setting of the drum. Channel 74 is wider than channel 64 and, with the drum 50 in the position shown in Fig. 4, channel 74 serves to place passage 63 in direct communication with an upright tube 65 opening into the outer chamber 24 of valve 23 whence the gas stream passes direct to the inspiratory tube. When drum 50 is in the position shown in Fig. 1, with channel 64 registering with passage 63, tube 65 is sealed against access of gas from passage 63, and the fresh gas is led by channel 64 to port 20.

To enable the absorbing unit 11 or container 12 to be speedily replaced, it is of advantage to provide means whereby the apparatus may be suspended. For this purpose the casing 10 is formed integrally with a pair of upstanding lugs 67 which are hollowed out at 68 so that they can be slidden upon and secured to a pair of parallel bars.

In operation, with valve 16 in communication with an expiratory tube and valve 23 in communication with an inspiratory tube, the expired gas will, if port 18 is fully open (Fig. 1), pass wholly to the rebreathing reservoir 13 through the absorbing unit 11 and, upon inhalation, will return through the absorbing unit 11 and pass out of the apparatus through valve 23. By rotating drum 49 so as partially or wholly to close port 18, (Fig. 4) part or all of the exhaled gas will pass directly into the rebreathing reservoir 13 through passage 59 with consequent diminution in carbon dioxide absorption. If an anaesthetic vapour is to be administered, drum 50 is rotated so as to open port 20 and permit the gas to enter container 12, the extent to which port 20 is opened determining the degree of vapour pick-up. In Fig. 1, drum 50 is shown in the position where port 20 is fully open and in consequence the whole of the gas stream passes through container 12, port 21, channel 66, port 22, valve 23 to the inspiratory tube. With this setting of the drum, fresh gas supplied to nipple 62 enters the drum through channel 64 and admixes with the gas stream prior to entering port 22. With the drum 50 in the position as shown in Fig. 4, the ports 20 and 21 are closed and the gas passes direct to port 22. In this case fresh gas supplied to nipple 62 admixes with the gas stream in the outer chamber 24 of valve 23, the fresh gas passing in the outer chamber via channel 74 and tube 65. With intermediate settings of the drum 50 part of the gas passes direct from drum 49 to port 22 and part passes through the container 12 to port 22. The contraction and expansion of reservoir 13 will cause knob 47 to rise and fall, thereby furnishing an indication of the depth of breathing. In the event that it is found necessary to impart forced breathing, this can speedily be accomplished by moving the knob 47 up and down whereupon air will be drawn in through valve 58, whilst valve 60 acts as a safety valve to ensure against the administration of air at too high a pressure.

From the foregoing description, it will be appreciated that a compact, portable and readily adjustable apparatus is provided in which the advantages accruing from the combined closed cycle and to-and-fro method are associated with a ready means for adjusting the carbon dioxide content of the re-inhaled gases; that a controlled quantity of anaesthetic vapour or other constituent may readily be admixed when desired with the re-inhaled gases; that forced breathing may be applied immediately the need arises; and that the apparatus may also be used for the administration of an anaesthetic vapour entrained in a current of fresh gas supplied without admixture of exhaled gas.

What is claimed is:

1. Apparatus for the administration of inhalant gases including a valve-casing, a re-breathing reservoir mounted on said valve-casing, said valve-casing constituting a part of the wall of the re-breathing reservoir, the remainder of the reservoir wall being at least in part expansible, and an absorption unit having inlet and outlet ports mounted on said valve-casing independently of said re-breathing reservoir, said absorption unit being traversible by said gases on passing into said re-breathing reservoir during exhalation and again traversible by said gases on passing out of said re-breathing reservoir during inhalation and said valve mechanism being operable to control the proportion of gases traversing the absorption unit on passing into and out of the re-breathing reservoir.

2. Apparatus according to claim 1 wherein said valve-casing constitutes a part of the wall of the re-breathing reservoir, the remainder of the reservoir wall being at least in part expansible, and a lever pivotally mounted intermediate its ends on said valve-casing, and having its one end coupled to the expansible part of said re-breathing reservoir, said lever being pivotally actuated by compression and expansion of said reservoir whereby the free end of said lever indicates the depth of breathing, and being manually operable to manually compress and expand said re-breathing reservoir when it is desired to effect artificial inspiration and exhalation.

3. Apparatus according to claim 1 wherein said valve-casing constitutes a part of the wall of the re-breathing reservoir, the remainder of the reservoir wall being at least in part expansible, and a lever pivotally mounted intermediate its ends on said valve-casing, and having its one end coupled to the expansible part of said re-breathing reservoir, said lever being pivotally actuated by compression and expansion of said reservoir whereby the free end of said lever indicates the depth of breathing, and being manually operable to manually compress and expand said re-breathing reservoir when it is desired to effect artificial inspiration and exhalation, and said valve-casing is provided with an auxiliary valve-controlled inlet adapted to open automatically and permit air to enter said re-breathing reservoir when the latter is expanded manually.

4. Apparatus according to claim 1 and comprising means including a proportioning valve whereby the gas to be administered may wholly or in part be contacted with the vapor of a volatile liquid, said proportioning valve and said proportioning valve-mechanism comprising a ported sleeve member constituting a supporting casing, and a pair of rotary ported drums mounted in said ported sleeve and independently operable therein to constitute a pair of rotary sleeve valves.

5. Apparatus according to claim 1 and comprising means including a proportioning valve whereby the gas to be administered may wholly or in part be contacted with the vapor of a volatile liquid, said proportioning valve and said proportioning valve-mechanism comprising a ported sleeve member constituting a supporting casing, and a pair of rotary ported drum mounted in said ported sleeve and independently operable therein to constitute a pair of rotary sleeve valves and wherein the proportioning valve for vapor entrainment is provided with a by-pass passage adapted to place the main outlet port in communication with a supply of gas under pressure.

WILLIAM EDMONDSON.
WILFRED JONES.